US008458186B2

(12) United States Patent
Stringham et al.

(10) Patent No.: US 8,458,186 B2
(45) Date of Patent: Jun. 4, 2013

(54) SYSTEMS AND METHODS FOR PROCESSING AND MANAGING OBJECT-RELATED DATA FOR USE BY A PLURALITY OF APPLICATIONS

(75) Inventors: Russell Stringham, Orem, UT (US); Eduardo Suarez, Marlow (GB)

(73) Assignee: Symantec Corporation, Mountain View, CA (US)

( * ) Notice: Subject to any disclaimer, the term of this patent is extended or adjusted under 35 U.S.C. 154(b) by 177 days.

(21) Appl. No.: 12/613,748

(22) Filed: Nov. 6, 2009

(65) Prior Publication Data

US 2011/0113466 A1 May 12, 2011

(51) Int. Cl.
*G06F 7/00* (2006.01)
*G06F 17/30* (2006.01)

(52) U.S. Cl.
USPC .......................... 707/741; 707/803; 707/804

(58) Field of Classification Search
USPC .................. 707/741–747, 803, 804
See application file for complete search history.

(56) References Cited

U.S. PATENT DOCUMENTS

| | | | | |
|---|---|---|---|---|
| 6,243,713 | B1 * | 6/2001 | Nelson et al. | 704/231 |
| 6,574,378 | B1 * | 6/2003 | Lim | 382/305 |
| 6,980,976 | B2 * | 12/2005 | Alpha et al. | 707/1 |
| 7,139,752 | B2 * | 11/2006 | Broder et al. | 704/9 |
| 7,139,938 | B2 * | 11/2006 | Marwaha | 714/48 |
| 7,293,005 | B2 * | 11/2007 | Fontoura et al. | 707/741 |
| 7,689,620 | B2 * | 3/2010 | Tan | 707/741 |
| 7,730,069 | B2 * | 6/2010 | Yamamoto et al. | 707/741 |
| 2003/0061195 | A1 * | 3/2003 | Laborde et al. | 707/1 |
| 2003/0200486 | A1 * | 10/2003 | Marwaha | 714/39 |
| 2005/0108630 | A1 | 5/2005 | Wasson et al. | |
| 2005/0198070 | A1 | 9/2005 | Lowry | |
| 2006/0248039 | A1 * | 11/2006 | Brooks et al. | 707/1 |
| 2008/0208820 | A1 | 8/2008 | Usey et al. | |
| 2009/0030898 | A1 | 1/2009 | Otsuki | |

FOREIGN PATENT DOCUMENTS

EP 2045728 A1 4/2009

OTHER PUBLICATIONS

UK Search Report received in related GB Application No. 1018244.2 on Feb. 18, 2011.
Zhou, Deng Peng; Delve Inside the Lucene Indexing Mechanisim; Jun. 27, 2006; http://www.ibm.com/developerworks/library/wa-lucene/ on Mar. 3, 2011.

* cited by examiner

*Primary Examiner* — Mariela Reyes
(74) *Attorney, Agent, or Firm* — ALG Intellectual Property, LLC

(57) ABSTRACT

A computer-implemented method for indexing data for use by a plurality of applications may include receiving a data object at a first application of a plurality of applications. The method may include tokenizing the common-form data object to extract tokens from the data object and creating an index of the tokens extracted from the data object, the index being formatted to be utilized by each of the plurality of applications. The method may further include storing the index in a database that is accessible by the plurality of applications. The plurality of applications may comprise two or more application types. Various other methods and systems are also disclosed.

19 Claims, 8 Drawing Sheets

SYSTEMS AND METHODS FOR PROCESSING AND MANAGING OBJECT-RELATED DATA FOR USE BY A PLURALITY OF APPLICATIONS

BACKGROUND

There are a number of software applications that gather and index data from computer files on a system. For example, search engines often index data from multiple files and utilize the indexed data to quickly search for specific file content within the files. Various applications used for data loss prevention, spam filtering, content management, archiving, and backup purposes may also generate and utilize indexes of files on a system. Often, each application that uses a file index must generate the file index separately from other programs. Accordingly, a number of different applications on a system may each index the same program files.

While file indexes may enable processes, such as searches, to be conducted in an efficient manner, creating the file indexes often uses a significant amount processing resources. Many files cannot be directly parsed to create an index. Rather, the files must first be converted to a common format such as HTML or plain text. Accordingly, a system that runs various indexing programs may waste time and resources indexing the various system files multiple times on different applications. The indexing processes may also place a significant drain on the system bandwidth and input/output performance. Accordingly, the instant disclosure identifies and addresses a need for systems and methods that consolidate indexing functions performed by multiple applications on a system.

SUMMARY

As will be described in greater detail below, the instant disclosure generally relates to systems and methods for indexing data for use by a plurality of applications. According to certain embodiments, a computer-implemented method for indexing data for use by a plurality of applications may include receiving a data object at a first application of a plurality of applications, tokenizing the data object to extract tokens from the data object, creating an index of the tokens extracted from the data object (the index being formatted to be utilized by each of the plurality of applications), and storing the index in a database that is accessible by the plurality of applications. The plurality of applications may include two or more application types. The common-form data object may include at least one of markup language (e.g., HTML or XML) and/or plain text.

In some embodiments, the data object may comprise a program-specific data object configured to be accessed by at least one program type and the method may further comprise converting the program-specific data object to a common-form data object. The method may also include receiving, from a second application of the plurality of applications, a request for the index and allowing the second application to access the database.

The method may further include generating at least one of metadata associated with the program-specific data object and/or a hidden file associated with the program-specific data object. The method may also include performing a data classification of the program-specific data object and associating the data classification results with at least one of the common-form data object and/or the index. In at least one example, associating the data classification results with the common-form data object may comprise creating data tags referencing the data classification results. In some examples, performing the data classification may comprise classifying data in the program-specific data object based on at least one of indexed metadata, indexed content, extracted patterns, and/or extracted entities.

According to some embodiments, the method may further include executing at least one policy based on the data classification of the program-specific data object. The at least one policy may include at least one of a spam policy, an anti-virus policy, a data-loss-prevention policy, an intellectual property leak-prevention policy, an archiving policy, a backup policy, a content-management policy, a legal-compliance policy, and/or an electronic-discovery policy. In some examples, the plurality of application types may include two or more of a search engine, an archiving application, a data-loss-prevention application, a spam-filtering application, an anti-virus application, a backup application, a content-management application, a legal-compliance application, and/or an electronic-discovery application.

According to various embodiments, the first application may perform at least one of converting the program-specific data object to the common-form data object, tokenizing the common-form data object, creating the index, performing the data classification of the program-specific data object, and/or performing language detection on the common-form data object. In some examples, the first application may instruct a third application to perform at least one of converting the program-specific data object to the common-form data object, tokenizing the common-form data object, creating the index, performing the data classification of the program-specific data object, and/or performing language detection on the common-form data object.

In various examples, the method may include performing at least one of language detection on the data object, pattern detection on the data object, and/or entity extraction on the data object. The method may additionally comprise receiving, from a second application of the plurality of applications, a request for the index and allowing the second application to access the index.

In at least one embodiment, a computer-implemented method for indexing data for use by a plurality of applications may include receiving a data object at a first application of a plurality of applications, tokenizing the common-form data object to extract tokens from the data object, creating an object index of the tokens extracted from the data object (the object index being formatted to be utilized by each of the plurality of applications), and incorporating the object index into a master index that includes indexing information associated with a plurality of data objects (the master index being accessible by the plurality of applications). The plurality of applications may include two or more application types. In at least one example, the master index may include a plurality of object indexes received from two or more of the plurality of applications.

In some embodiments, a system for indexing data for use by a plurality of applications may include a communication module programmed to receive a data object at a first application of a plurality of applications. The system may also include a tokenization module programmed to tokenize the common-form data object to extract tokens from the data object and an indexing module programmed to create an index of the tokens extracted from the data object. The system may additionally include a database for storing the index, wherein the database is accessible by the plurality of applications.

In some examples, the system may also include a conversion module programmed to convert the program-specific data object to a common-form data object, a language-detection module programmed to perform language detection on the common-form data object, a classification module programmed to perform data classification of the program-specific data object, and a security module programmed to limit data access to authorized applications.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
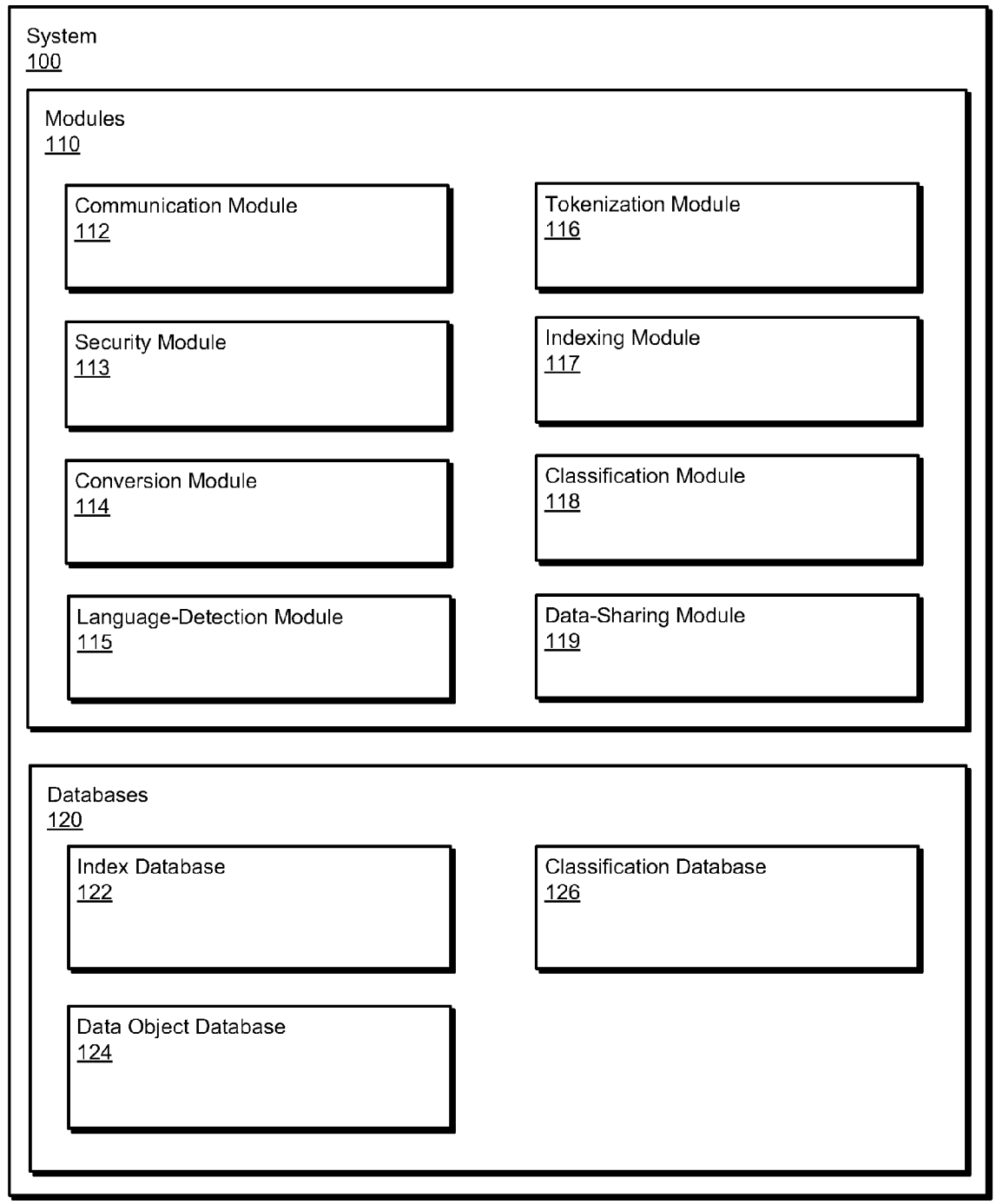
FIG. 1 is a block diagram of an exemplary system for indexing data for use by a plurality of applications.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the present disclosure generally relates to various methods and systems for indexing data for use by a plurality of applications. Embodiments of this disclosure may enable a data object (e.g., a PDF, DOC, XLS, PPT, or MSG file) to be indexed by a first application of a plurality of applications in a system (such as a plurality of applications of two or more different application types). The index of the data object may be stored in a database that is accessible by each of the plurality of applications in the system and may be utilized by each of the plurality of applications in the system. Accordingly, instead of requiring each of the plurality of applications to separately generate an index of the data object, the methods and systems disclosed herein may enable the first application encountering the data object to generate an index that is accessible by each of the plurality of applications.

For example, a first application may receive a program-specific data object and may convert the program-specific data object to a common-form data object (e.g., an HTML, XML, or plain text document). The first application may then tokenize the common-form data object and create an index of tokens extracted from the common-form data object (e.g., words, fields, and/or metadata tags). The index may be formatted to be used by each of the plurality of applications (e.g., a search engine, a data-loss-prevention application, a spam-filtering application, an anti-virus application, a content-management application, an archiving application, and/or a backup application). The index may then be stored in a database that is accessible by the plurality of different applications.

The following will provide, with reference to FIGS. 1-4, detailed descriptions of exemplary systems for indexing data for use by a plurality of applications. Detailed descriptions of corresponding computer-implemented methods will also be provided in connection with FIGS. 5 and 6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for indexing data for use by a plurality of applications. Exemplary system 100 may include one or more modules 110 for performing one or more tasks. As illustrated in FIG. 1, modules 110 may include a communication module 112, a security module 113, a conversion module 114, a language-detection module 115, a tokenization module 116, an indexing module 117, a classification module 118, and a data-sharing module 119.

Communication module 112 may be programmed to receive a data object, such as a program-specific data object configured to be accessed by at least one program type. Security module 113 may be programmed to filter requests for data, such as index and classification data, based on security policies to ensure relevant data and metadata is transferred only to authorized applications and users. Conversion module 114 may be programmed to convert the data object to a common-form data object. Language-detection module 115 may be programmed to perform language detection on the data object. Tokenization module 116 may be programmed to tokenize the data object by extracting tokens from the data object following language-detection. Indexing module 117 may be programmed to create an index of the tokens extracted from the data object. Classification module 118 may be programmed to perform a data classification of the data object. Data-sharing module 119 may be programmed to share the index with a plurality of applications. Although illustrated as separate elements, one or more of modules 110 in FIG. 1 may represent portions of a single module or application.

In certain embodiments, one or more of modules 110 in FIG. 1 may represent one or more software applications or programs (e.g., search, data-loss-prevention, spam-filtering, content-management, archiving, and/or backup software) that, when executed by a computing device, may cause the computing device to perform one or more tasks. For example, as will be described in greater detail below, one or more of modules 110 may represent software modules stored and configured to run on one or more computing applications and/or devices, such as the applications illustrated in FIG. 2 (i.e., first application 212, second application 222, and/or database subsystem 230), the applications and devices illustrated in FIG. 3 (i.e., first application 312, second application 322, third application 332, and/or database subsystem 340), the applications and devices illustrated in FIG. 4 (i.e., first application 412, second application 422, and/or enterprise application 432), computing system 710 in FIG. 7, and/or portions of exemplary network architecture 800 in FIG. 8. One or more of modules 110 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. As shown, databases 120 may include an index database 122 for storing indexes of data objects. Databases 120 may also include a data object database 124 for storing data objects, such as common-form data objects and a classification database 126 for storing classification data related to the data objects. In some embodiments, one or more of the databases may be the index itself.

Databases 120 in FIG. 1 may represent a portion of one or more computing devices. For example, databases 120 may represent a portion of database subsystem 230 in FIG. 2, database subsystem 340 in FIG. 3, enterprise database 434 in FIG. 4, computing system 710 in FIG. 7, and/or portions of exemplary network architecture 800 in FIG. 8. Alternatively, databases 120 in FIG. 1 may represent one or more physically separate devices capable of being accessed by a computing device, such as database subsystem 230 in FIG. 2, database subsystem 340 in FIG. 3, enterprise database 434 in FIG. 4, computing system 710 in FIG. 7, and/or portions of exemplary network architecture 800 in FIG. 8.

In at least one embodiment, all or a portion of system 100 may be configured to run on a single physical computing device. For example, all or a portion of system 100 may comprise a plurality of different applications configured to run on a single computing device. In additional embodiments, system 100 may be configured to run on multiple computing devices, such as a plurality of networked computing devices.

Figure 2:
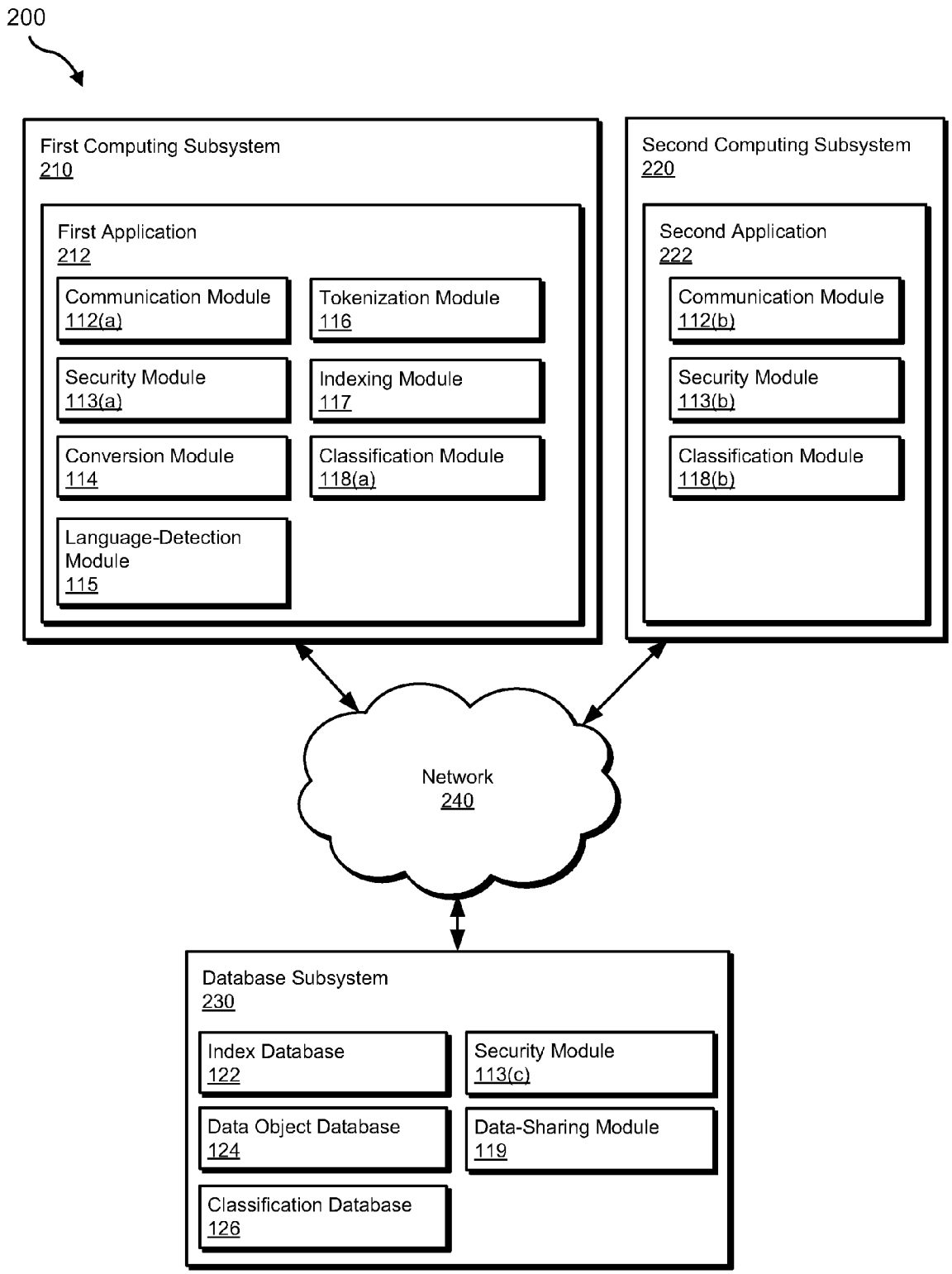
FIG. 2 is a block diagram of another exemplary system for indexing data for use by a plurality of applications.

In some embodiments, all or a portion of exemplary system 100 may represent portions of network-based system 200 illustrated in FIG. 2. FIG. 2 is a block diagram of an exemplary system 200 for indexing data for use by a plurality of applications. As illustrated in this figure, exemplary system 200 may include a first computing subsystem 210 in communication with a second computing subsystem 220 and database subsystem 230 connected via a network 240. In some embodiments, all or a portion of exemplary system 200 may represent portions of a cloud-computing environment. Cloud-computing environments may provide various services and applications via the Internet.

First computing subsystem 210 and second computing subsystem 220 may be located on one or more computing devices. For example, first computing subsystem 210 and second computing subsystem 220 may be located on a single computing device. In additional examples, first computing subsystem 210 may be located on a first computing device and second computing subsystem 220 may be located on a second computing device that is separate from the first computing device. Computing devices comprising first computing subsystem 210 and/or second computing subsystem 220 generally represent any type or form of computing device capable of reading computer-executable instructions, such as, for example, laptops, desktops, servers, embedded systems, combinations of one or more of the same, exemplary computing system 710 in FIG. 7, or any other suitable computing devices.

According to various embodiments, database subsystem 230 may represent any type or form of computing device that is capable of providing data storage and/or data-sharing services. Examples of database subsystem 230 include, without limitation, various types of computing devices (e.g., those listed for first computing subsystem 210 and second computing subsystem 220), application servers configured to run certain software applications, and/or database servers configured to provide various database services. In some examples, database subsystem 230 may be located on a computing device that is separate from first computing subsystem 210 and/or second computing subsystem 220. In additional examples, database subsystem 230 may be located on the same computing device as first computing subsystem 210 and/or second computing subsystem 220.

Network 240 generally represents any medium or architecture capable of facilitating communication or data transfer. Examples of network 240 include, without limitation, at least a portion of an intranet, a wide area network ("WAN"), a local area network ("LAN"), a personal area network ("PAN"), the Internet, power line communications ("PLC"), a cellular network (e.g., a GSM Network), exemplary network architecture 800 in FIG. 8, or the like. Network 240 may facilitate communication or data transfer using wireless and/or wired connections. In one embodiment, network 240 may facilitate communication between first computing subsystem 210, second computing subsystem 220, and/or database subsystem 230.

As shown in FIG. 2, first computing subsystem 210 may include a first application 212 and second computing subsystem 220 may include a second application 222. First application 212 and second application 222 generally represent any type of software applications capable of carrying-out various computer-executable instructions. Examples of first application 212 and second application 222 include, without limitation, a search engine, an archiving application, a backup application, a data-loss-prevention application, a spam-filtering application, an anti-virus application, a legal compliance application, an electronic discovery application, a content management application, and/or any other suitable application, such as an application capable of carrying-out an indexing function.

According to at least one embodiment, first application 212 may include a communication module 112(a), a security module 113(a), a conversion module 114, a tokenization module 116, an indexing module 117, and a classification module 118(a). Communication module 112(a) may send data to and/or receive data from one or more applications, such as applications connected to first computing subsystem 210 and/or network 240. In some examples, communication module 112(a) may send and/or receive various data objects, such as program-specific data files and/or documents (e.g., DOC, PDF, XLS, PPT, and/or MSG files). Examples of data objects that may be sent and/or received by communication module 112(a) may include, without limitation, word-processing files, portable document files, spreadsheets files, instant-message files, text-message files, multi-media presentation files, e-mail files, text files, hypertext files, and/or any other suitable file type.

Communication module 112(a) may be programmed to receive a program-specific data object that is configured to be accessed by at least one program type, such as, for example, a word processing program, a portable document viewing and/or editing program, a spreadsheet program, an instant-message program, a text-message program, a multi-media presentation program, an e-mail program, and/or any other suitable software program type. According to at least one embodiment, first application 212 may receive the program-specific data object prior to other applications, such as second application 222, in system 200.

In some examples, first application 212 may determine whether the program-specific data object was previously received, indexed, and/or stored by another application, such as second application 222, in system 200. For example, first application 212 may send a request to data-sharing module 119 of database subsystem 230 requesting data, such as indexing data, associated with the program-specific data object. If first application 212 receives a response from database subsystem 230 indicating that the requested data associated with the program-specific data object is not stored in database subsystem 230 or in other locations in system 200, first application 212 may proceed to index the program-specific data object. First Application 212 may use metadata associated with the object, such as its name, location, size, creation date, last modification date, and/or a fingerprint of the object to determine if it has previously seen the object. The fingerprint may consist of a hash or a checksum, such as MD5 or SHA-1, or any other suitable hashing algorithm.

Conversion module 114 may convert a program-specific data object to a common-form data object. For example, conversion module 114 may convert a program-specific data object, such as a DOC, PDF, XLS, PPT, and/or MSG file, to a common-form data object, such as an HTML, XML, and/or text file. Language-detection module 115 may perform language detection on the common-form data object. Tokenization module 116 may then tokenize the common-form data object. Tokenization may include identification and extraction of tokens, such as words and/or other meaningful units (e.g., tags, kanji characters, and/or sub-words) in the common-form data object. In some examples, tokenization of the common-form data object may also include stemming of various words identified within the common-form data object. In some examples, language detection and/or tokenization may be performed on the program-specific data object.

Indexing module 117 may subsequently create an index of tokens extracted from the common-form data object and/or the program-specific data object, such as tokens extracted by tokenization module 116. The index created by indexing module 117 may be formatted so that it can be utilized by a plurality of different application types. For example, the index may be formatted to be utilized by one or more of a search engine, an archiving application, a data-loss-prevention application, a spam-filtering application, an anti-virus application, a content-management application, a legal-compliance application, an electronic-discovery application, and/or any other suitable application type configured to utilize an index of data objects stored in system 200. According to various examples, classification module 118(a) may perform a data classification of the program-specific data object. Classification data may be used by one or more applications to readily identify and/or categorize data objects. According to at least one example, some classification of the data object may be performed prior to indexing. For example, regular expressions utilized for classification and pattern detection (e.g., REGEX) may be run prior to indexing the data object. In additional examples, pattern detection and entity extraction may also be performed on the data prior to indexing.

According to various embodiments, second application 222 may include a communication module 112(b), a security module 113(b), and a classification module 118(b). Communication module 112(b) may send data to and/or receive data from one or more applications, such as applications connected to second computing subsystem 210 and/or network 240. Classification module 118(b) may perform a data classification of data received by communication module 112(b). According to at least one example, second application 222 may also include a conversion module, a language-detection module, a tokenization module, and an indexing module similar to those described above with reference to first application 212. In some examples, second application 222 may receive a program-specific data object prior to first application 212. In such examples, second application 222 may convert the program-specific data object to a common-form data object, perform language detection on the common-form data object, tokenize the common-form data object, and/or index the common-form data object.

Database subsystem 230 may include an index database 122, a security module 113(c), a data object database 124, a classification database 126, and/or a data-sharing module 119. Index database 122 may store one or more data element indexes such as, for example, indexes of data objects created by indexing module 117. According to at least one embodiment, index database 122 may include a master index comprising a compilation of two or more data object indexes.

Data object database 124 may store program-specific data objects and/or common-form data objects. Classification database 126 may store classification information associated with one or more data objects. In some embodiments, index database 122, data object database 124, and/or classification database 126 may be included in a single index. Data-sharing module 119 may share index information, classification information, and/or data objects with one or more applications connected to network 240, such as, for example, first application 212 and/or second application 222. According to at least one example, data stored on database subsystem 230 may be associated with one or more data objects.

Figure 3:
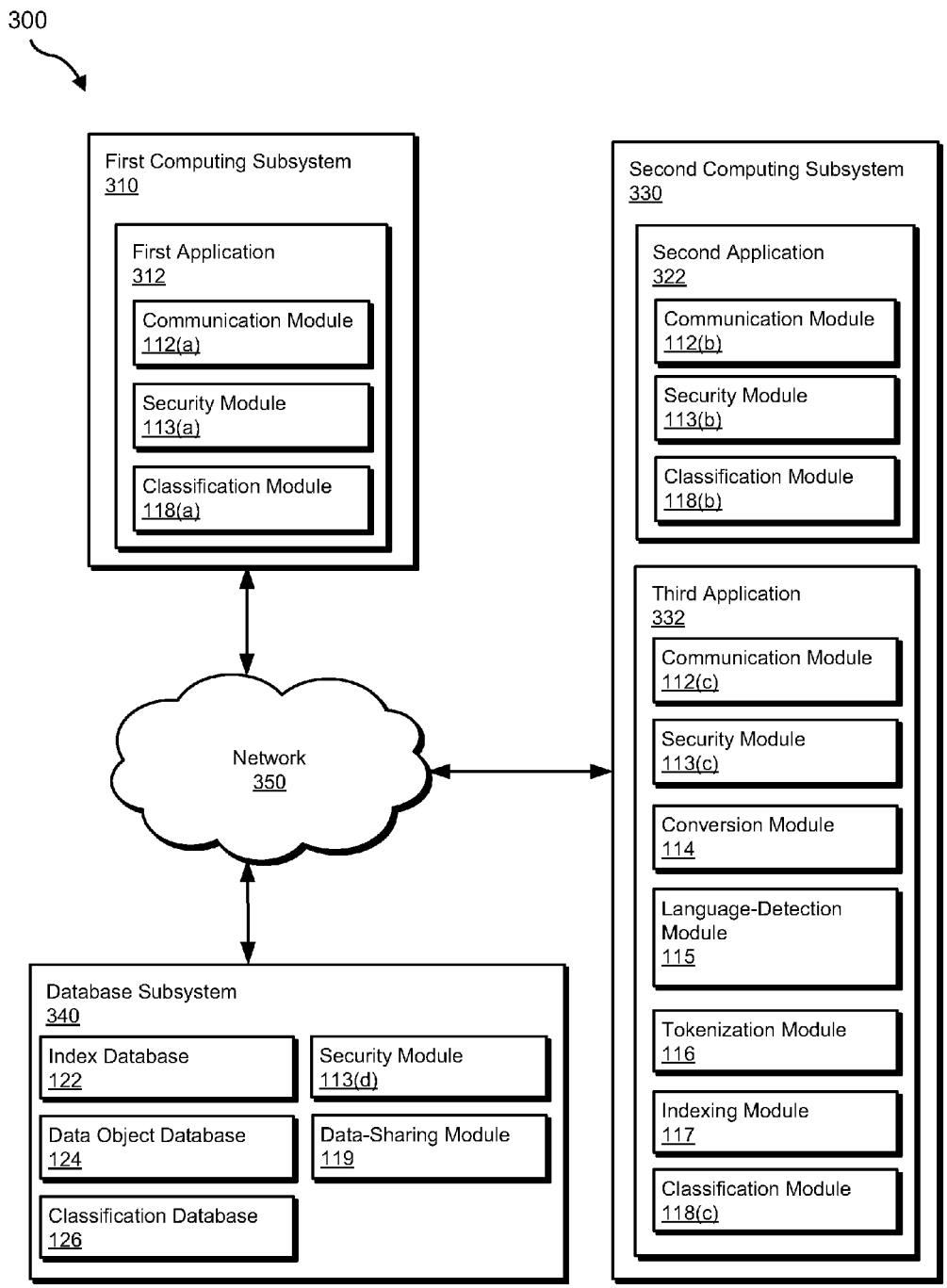
FIG. 3 is a block diagram of another exemplary system for indexing data for use by a plurality of applications.

As mentioned previously, exemplary system 100 in FIG. 1 may be configured in a variety of ways. For example, all or a portion of exemplary system 100 may represent portions of exemplary network-based system 300 illustrated in FIG. 3. FIG. 3 is a block diagram of an exemplary network-based system 300 for indexing data for use by a plurality of applications. As illustrated in this figure, exemplary system 300 may include a first computing subsystem 310, a second computing subsystem 330, and a database subsystem 340 connected via a network 350. Examples of network 350 include, without limitation, various types of networks (such as those listed for network 240 in FIG. 2). First computing subsystem 310, second computing subsystem 330 and database subsystem 340 may be located on one or more computing devices. For example, first computing subsystem 310, second computing subsystem 330, and/or database subsystem 340 may be located on a single computing device or on two or more separate computing devices.

According to various embodiments, first computing subsystem 310 may comprise a first application 312 that includes a communication module 112(a), a security module 113(a), and a classification module 118(a) and second computing subsystem 330 may comprise a second application 322 that includes a communication module 112(b), a security module 113(b), and a classification module 118(b). In some examples, two or more applications and/or databases (e.g., a desktop search application, an archiving application, a backup application, and/or a data-loss-prevention application) may be located on a single computing device, such as a personal desktop computer. For example, as illustrated in FIG. 3, second computing subsystem 330 may also comprise a third application 332. According to various embodiments, third application 332 may include a communication module 112(c), a security module 113(b), a conversion module 114, a language-detection module 115, a tokenization module 116, an indexing module 117, and a classification module 118(c). Database subsystem 340 may include an index database 122, a data object database 124, a classification database 126, and a data-sharing module 119. Examples of first computing subsystem 310, second computing subsystem 330, and database subsystem 340 include, without limitation, various types of computing devices (such as those listed for first computing subsystem 210, second computing subsystem 220, and database subsystem 230 in FIG. 2).

According to at least one embodiment, first application 312 may receive a program-specific data object prior to other applications in system 300, such as second application 322 or third application 332. For example, communication module 112(a) of first application 312 may receive the program-specific data object. After receiving the program-specific data object, first application 312 may instruct another application to convert the program-specific data object to a common-form data object, perform language detection on the data object, tokenize the data object, index the data object, and/or classify the data object. For example, first application 312 may instruct third application 332 to convert the program-specific data object to a common-form data object, perform language detection on the data object, tokenize the data object, create an index of data extracted from the data object, and then assign various classifications to the data object based on data within the object.

Indexing data produced by third application 332 may be stored in database subsystem 340. Common-form data objects, classification data, and/or any other data generated by third application 332 may also be stored on database subsystem 340. Database subsystem 340 may receive a request from second application 322 (or one or more other applications in system 300) for an index, such as an index of a data object created by third application 332. In some embodiments, database subsystem 340 may also receive a request from second application 322 for other data associated with the index and/or data object including, for example, classification data and/or a common-form data object representative of the program-specific data object. In at least one example, data-sharing module 119 of database subsystem 340 may allow second application 322 to access the requested data in accordance with security policies as determined by security module 113(d). In some embodiments, data-sharing module 119 may send the requested data to second application 322 and/or other applications in system 300 in accordance with security policies as determined by security module 113(d).

Figure 4:
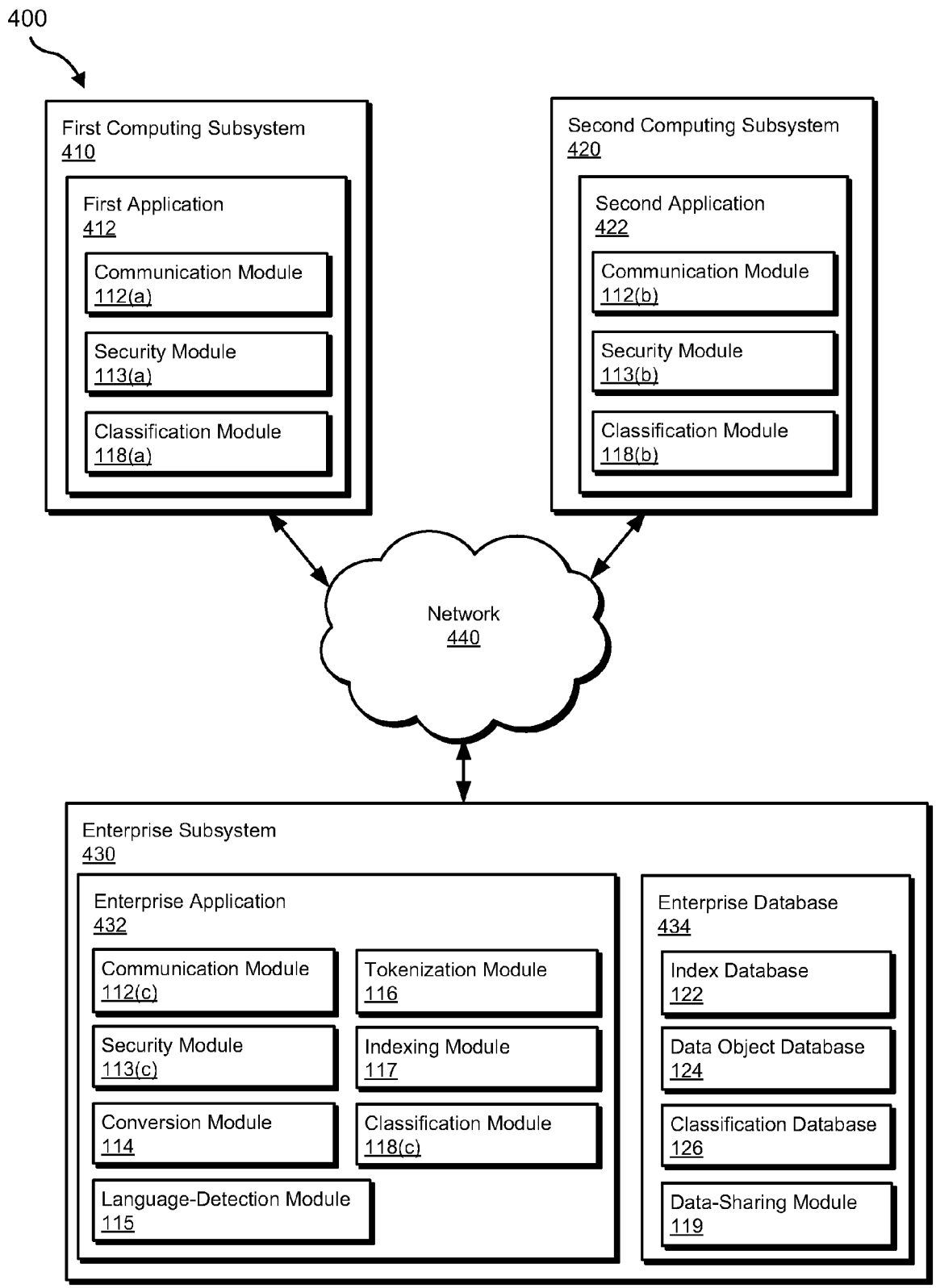
FIG. 4 is a block diagram of another exemplary system for use by a plurality of applications.

According to various embodiments, all or a portion of exemplary system 100 may represent portions of exemplary network-based system 400 illustrated in FIG. 4. FIG. 4 is a block diagram of an exemplary network-based system 400 for indexing data for use by a plurality of applications. As illustrated in this figure, exemplary system 400 may include a first computing subsystem 410, a second computing subsystem 420, and an enterprise subsystem 430 connected via a network 440. Examples of network 440 include, without limitation, various types of networks (such as those listed for network 240 in FIG. 2).

First computing subsystem 410, second computing subsystem 420, and enterprise subsystem 430 may be located on one or more computing devices. For example, first computing subsystem 410, second computing subsystem 420, and/or enterprise subsystem 430 may be located on a single computing device or on two or more separate computing devices. Examples of first computing subsystem 410, second computing subsystem 420, and enterprise subsystem 430 include, without limitation, various types of computing devices (such as those listed for first computing subsystem 210, second computing subsystem 220, and database subsystem 230 in FIG. 2).

According to various embodiments, first computing subsystem 410 may comprise a first application 412 that includes a communication module 112(a), a security module 113(a), and a classification module 118(a), and second computing subsystem 420 may comprise a second application 422 that includes a communication module 112(b), a security module 113(b), and a classification module 118(b). Enterprise subsystem 430 may include an enterprise application 432 that comprises a communication module 112(c), a security module 113(c), a conversion module 114, a language-detection module 115, a tokenization module 116, an indexing module 117, and a classification module 118(c). According to various embodiments, enterprise subsystem 430 may also include an enterprise database 434 that includes an index database 122, a data object database 124, a classification database 126, and a data-sharing module 119.

Enterprise subsystem 430 may comprise a computing subsystem that is programmed to provide services for computing devices and/or subsystems, such as first computing subsystem 410 and second computing subsystem 420, in exemplary system 400. Examples of services provided by enterprise subsystem 430 include, without limitation, data search and/or storage services. According to various embodiments, different services provided by enterprise subsystem 430 may be provided by a plurality of different software application types. According to some examples, first computing subsystem 410 and/or second computing subsystem 420 may also perform various backup, archiving, security, and/or content management operations (e.g., anti-virus protection, spam-filtering, and data-loss protection services). First computing subsystem 410 and/or second computing subsystem 420 may utilize data obtained by enterprise subsystem 430, such as index and classification data, for performing the backup, archiving, security, and/or content management operations.

In at least one embodiment, enterprise subsystem 430 may include an enterprise application 432 (e.g., an enterprise search appliance, an embedded search engine, or a hosted search engine) programmed to provide services such as search and/or storage services, for computing devices and/or subsystems in system 400. For example, enterprise application 432 may be programmed to search elements of one or more data objects on first computing subsystem 410 and/or second computing subsystem 420. In order to facilitate a search of the data objects, conversion module 114 may convert the data objects to common-form data objects, language-detection module 115 may perform language detection on the data objects, tokenization module 116 may tokenize the data objects, and indexing module 117 may create indexes of the one or more data objects. When a search request for the one or more data objects is received by enterprise application 432, the indexes may be searched by enterprise application 432.

According to at least one embodiment, first application 412 may receive a program-specific data object prior to other applications, such as second application 422, in system 400. For example, communication module 112(a) of first application 412 may receive the program-specific data object. After receiving the program-specific data object, first application 412 may instruct enterprise application 432 to convert the program-specific data object to a common-form data object, tokenize the data object, and/or index the data object. For example, first application 412 may instruct enterprise application 432 to convert the program-specific data object to a common-form data object, perform language-detection on the data object, tokenize the common-form data object, and create an index of tokens extracted from the common-form data object.

In some examples, first application 412 may convert a program-specific data object to a common-form data object, perform language-detection on the data object, tokenize the data object, and/or index the data object. The index of the data object created by first application 412, and/or any other suitable data associated with the program-specific data object, such as the common-form data object and/or any relevant classification data, may be transferred from first application 412 to enterprise application 432.

In some embodiments, first application 412 may determine whether the program-specific data object was previously received by, converted, indexed, and/or otherwise stored in system 400 by one or more other applications, such as second application 422. For example, first application 412 may send a request to data-sharing module 119 of enterprise application 432 requesting data, such as indexing data, associated with the program-specific data object. If first application 412 receives a response from enterprise application 432 indicating that the requested data associated with the program-specific data object is not stored in enterprise database 434 or in other locations in system 400, first application 412 may proceed to index the program-specific data object and/or direct enterprise application 432 to index the program-specific data object.

Figure 5:
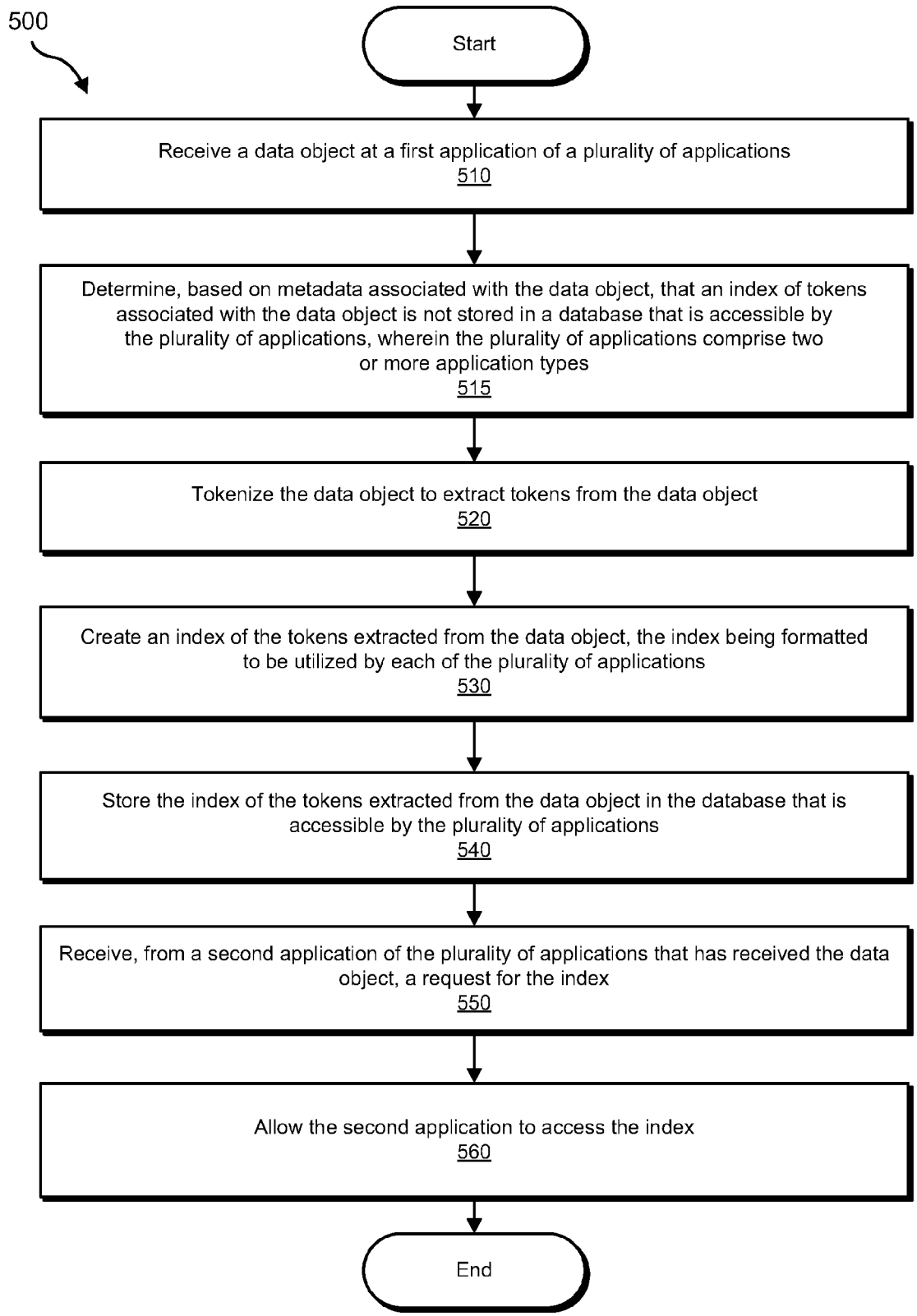
FIG. 5 is a flow diagram of an exemplary method for indexing data for use by a plurality of applications.

FIG. 5 is a flow diagram of an exemplary computer-implemented method 500 for indexing data for use by a plurality of applications. The steps shown in FIG. 5 may be performed by any suitable computer-executable code and/or computing system. In some embodiments, the steps shown in FIG. 5 may be performed by one or more of the components of system 100 in FIG. 1, one or more of the subsystems of system 200 in FIG. 2, one or more of the subsystems of system 300 in FIG. 3, and/or one or more of the subsystems of system 400 in FIG. 4, as will be explained in greater detail below.

At step 510 in FIG. 5, the system may receive a data object at a first application of a plurality of applications. In at least one example, the data object may comprise a program-specific data object configured to be accessed by at least one program type. For example, communication module 112 may receive a program-specific data object, such as a word processing file. Communication module 112 may receive the data object in a variety of contexts. For example, communication module 112 may receive the data object by identifying the program-specific data object during an indexing process and determining that the program-specific data object has not yet been indexed by another application. In some embodiments, communication module 112 may comprise a plug-in (or other code) that is included with an application that performs indexing, such as a backup application and/or desktop search application.

The plurality of applications may comprise two or more application types. For example, first application 212 and a second application 222 in FIG. 2 may each comprise a different application type. To illustrate, first application 212 may comprise an application programmed to conduct data searches of indexed data objects within system 200. Second application 222, on the other hand, may be configured to create backup files of data objects within system 200. Second application 222 may use index data associated with the data objects to backup and subsequently retrieve backed-up data. The index stored in the system in a database, such as index database 122, may be utilized by both a first application 212 and a second application 222.

In some embodiments, the data object may be a program-specific data object, and the system may convert the program-specific data object to a common-form data object. For example, conversion module 114 may convert a word processing file to a file format that can be easily read and/or otherwise utilized by two or more application types. A common-form data object may comprise, for example, a markup language (e.g., HTML or XML) and/or plain text language.

In at least one embodiment, the first application (e.g., first application 212) may convert the program-specific data object to the common-form data object. In additional examples, the first application may instruct another application to convert the program-specific data object to the common-form data object. For example, first application 312 in FIG. 3 may instruct third application 332 to convert a program-specific data object to a common-form data object. In at least one example, first application 412 in FIG. 4 may instruct enterprise application 432 to convert the program-specific data object to a common-form data object. The system may then perform language detection on the data object. For example, language-detection module 115 may perform language-detection on the common-form data object prior to tokenization and indexing of the data object. In the following discussion of the steps of FIG. 5, the phrase "data object" may refer to a data object that has not been converted to a common-form data object or a data object that has been converted to a common-form data object.

At step 515 in FIG. 5, the system may determine, based on metadata associated with the data object, that an index of tokens associated with the data object is not stored in a database that is accessible by the plurality of applications, wherein the plurality of applications comprise two or more application types. At step 520 in FIG. 5, the system may tokenize the data object to extract tokens from the data object. For example, tokenization module 116 may tokenize the common-form data object by identifying words in the common-form data object. In some embodiments, other meaningful units, such as tags and/or sub-words, may be identified during tokenization of the data object. According to various embodiments, the first application may tokenize the data object or the first application may instruct another application (e.g., third application 332 and/or enterprise application 432) to tokenize the data object.

At step 530 in FIG. 5, the system may create an index of the tokens extracted from the data object, which is an index of the data object. The index may be formatted to be utilized by each of the plurality of applications. For example, indexing module 117 may create an index of tokens extracted from the data object, such as tokenized words and/or other meaningful units, within the data object. The first application may create the index and/or the first application may instruct another application (e.g., third application 332 and/or enterprise application 432) to index the tokens from the data object.

At step 540 in FIG. 5, the system may store the index in a database that is accessible by the plurality of applications. For example, the index may be stored in a network-based database and/or an enterprise-based database, such as a database located on enterprise database 434, that is accessible by first application 412 and second application 422 in accordance with security policies established and enforced by security module 113(c). According to certain embodiments, the index may be saved to the database in a compressed format. The compressed format of the index may reduce the storage space used on the database and/or may reduce the bandwidth used to transfer the index over the network.

According to at least one embodiment, method 500 may further comprise receiving a request for the index from another application in the system. At step 550 in FIG. 5, the system may receive, from a second application of the plurality of applications that has received the data object, a request for the index. For example, second application 222 in system 200 may request the index from database subsystem 230. At step 560 in FIG. 5, the system may allow the second application to access the index. In some examples, the method may further comprise allowing the second application to access the index stored in index database 122. For example, in accordance with the security policies established and enforced by security module 113(*c*), second application 222 may be permitted to search the index itself or to utilize enterprise application 432 to search the index.

According to various embodiments, method 500 may also comprise storing the data object in the database. For example, a common-form data object representative of a program-specific data object may be stored in data object database 124. In some examples, the program-specific data object may also be stored in data object database 124. The program-specific data object may be associated in the database with the common-form data object and/or the index of the data object. In certain examples, the common-form data object may be stored in the database in a compressed format.

In at least one embodiment, the system may also generate at least one of metadata associated with the program-specific data object and/or a hidden file associated with the program-specific data object. The metadata and/or the hidden file may be transferred to another application along with the program-specific data object. In some examples, when the program-specific data object is deleted or otherwise removed from the system, the metadata and/or hidden file associated with the program-specific data object may also be deleted from the system.

For example, for a word processing document stored on a WINDOWS NTFS file system, a common form data object may be stored in an alternate data stream of the same file that stores the word processing document itself. The index may be stored in yet another stream of this same file. Data classification information related to the word processing document may be stored in yet another data stream, or included in the common-form or index streams. Multiple applications may each provide separate data classifications for the document and each application may store its classifications in a separate stream or grouped into one of the other streams. For example, a data-loss-prevention application may provide a classification that a document contains credit card numbers and/or social security numbers. In some examples, an anti-virus application may classify a document as containing a macro-virus. In additional examples, an archiving application may classify a document as needing to be retained for seven years. All of these alternate streams may be hidden from the end-user based on security policies established by a security module, such as security module 113(*c*), but may available to other applications, such as first application 212 or 222, that may wish to access them.

If the user deletes the document, the alternate streams may be automatically deleted. If the user moves the document to another location on the same volume, the alternate streams may move with the document. If the user copies the document, the streams may be copied, depending on the method used to perform the copy operation. For example, when a MICROSOFT WORD document (or other MICROSOFT OFFICE document) is modified, WORD may write the new version of the document to a different file, delete the old version, and then rename the new version to the correct name. This may automatically delete all of the metadata that was associated with older version of the document, such as metadata that might not apply to the new version. For files that are modified in-place, the alternate steams may no longer apply to the file. Timestamps, fingerprints, or other metadata may be used to determine when the alternate data streams are out-of-date.

In at least one embodiment, method 500 may also comprise receiving a request for the common-form data object. For example, second application 222 may request the common-form data object from database subsystem 230 and data-sharing module 119 may send the common-form data object to second application 222 in accordance with the security policies established and enforced by security module 113(*c*). Additionally, data-sharing module 119 may also send any other requested data associated with the common-form data object and/or the program-specific data object.

According to some embodiments, method 500 may further comprise performing a data classification of the program-specific data object and associating the data classification results with at least one of the common-form data object, the program-specific data object, and/or the index. For example, classification module 118 may identify elements of the data object and may classify the data object and/or the identified elements of the data object. In at least one example, associating the data classification results with the common-form data object may comprise adding data tags referencing the data classification results.

In additional examples, method 500 may comprise executing at least one policy based on the data classification results. Examples of the at least one policy may include, without limitation, a spam policy, an anti-virus policy, a data-lost-prevention policy, an intellectual property leak-prevention policy, an archiving policy, and backup policy, content-management policy (such as a classification and/or filtering policy), an electronic discovery policy, and/or a legal compliance policy. The classification results may determine one or more policies that are applied to the program-specific data object. To illustrate, a spam policy may be executed to quarantine the program-specific data object if the classification results indicate that the program-specific data object comprises a spam email.

Figure 6:
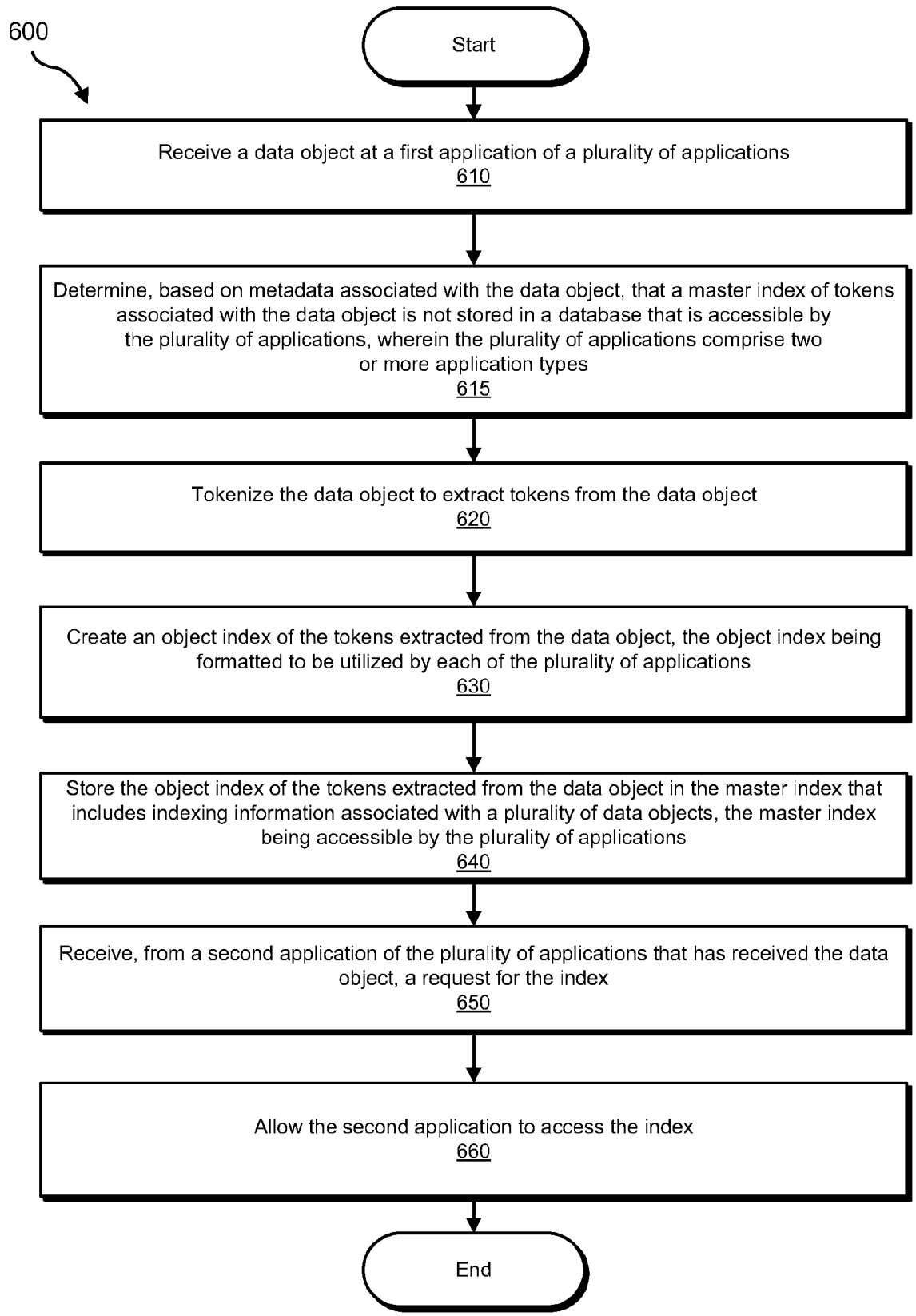
FIG. 6 is a flow diagram of another exemplary method for indexing data for use by a plurality of applications.

FIG. 6 is a flow diagram of an exemplary computer-implemented method 600 for indexing data for use by a plurality of applications. The steps shown in FIG. 6 may be performed by any suitable computer-executable code and/or computing system. In some embodiments, the steps shown in FIG. 6 may be performed by one or more of the components of system 100 in FIG. 1, one or more of the subsystems of system 200 in FIG. 2, one or more of the subsystems of system 300 in FIG. 3, and/or one or more of the subsystems of system 400 in FIG. 4, as will be explained in greater detail below.

At step 610 in FIG. 6, the system may receive a data object at a first application of a plurality of applications. For example, the data object may comprise a program-specific data object configured to be accessed by at least one application type. In some embodiments, the system may convert the program-specific data object to a common-form data object and may perform language detection on the data object. At step 615 in FIG. 6, the system may determine, based on metadata associated with the data object, that a master index of tokens associated with the data object is not stored in a database that is accessible by the plurality of applications, wherein the plurality of applications comprise two or more application types. At step 620 in FIG. 6, the system may tokenize the data object. At step 630 in FIG. 6, the system may create an object index of the tokens extracted from the data object. The object index may be formatted to be utilized by each of the plurality of applications. Steps 610, 620, and 630 in FIG. 6 are similar to steps 510, 520, and 530 in FIG. 5. Therefore, the previous discussions of steps 510-530 may also apply to steps 610-630.

At step 640 in FIG. 6, the system may store the object index in a master index that includes indexing information associated with a plurality of data objects. For example, the master index may comprise object indexes for a plurality of common-form data objects converted from a plurality of program-specific data objects. In some examples, the master index may include indexes received from a plurality of applications. The master index may comprise an index stored to a network-based database and/or an enterprise-based database, such as a database located on enterprise application 432. In some embodiments, the master index may be stored in a hidden area at a location where the program-specific data object is stored, such as a database on first computing subsystem 210 in system 200. Individual object indexes may also be stored as stand-alone indexes at a location where the program-specific data object is stored. At step 650 in FIG. 6, the system may receive, from a second application of the plurality of applications that has received the data object, a request for the index. At step 660 in FIG. 6, the system may allow the second application to access the index.

According to various embodiments, the master index may be accessible by the plurality of applications in the system. In at least one example, the plurality of applications may comprise two or more application types. To illustrate, at least one of the applications in the system, such as first application 212, may comprise a data-loss prevention application and another of the applications in the system, such as second application 222, may comprise an archiving application. In various embodiments, the master index may comprise a plurality of object indexes received from two or more of the plurality of applications.

As explained previously, by providing a means for indexing data for use by a plurality of applications, the systems and methods described herein may enable a first application of a plurality of applications to create an index of a data object that may be utilized by each of the plurality of applications, thereby eliminating the need for each of the plurality of applications to separately create indexes of the data object.

For example, first application 412 may encounter a MICROSOFT WORD document that has not yet been indexed. It may notify an enterprise application 432 on enterprise subsystem 430, which may be, for example, an enterprise search appliance and/or engine, to process the WORD document. Enterprise application 432 may then create a common-form version of the document, perform language detection on the common-from version of the document, tokenize the common-form version of the document, then index the result, storing the common-form version of the document and the index on enterprise database 434. First application 412 may then use the common-form version of the document or the index to perform its tasks. Second application 422 may then encounter the same MICROSOFT WORD document, determine that it has already been indexed, and use the index stored on enterprise database 434 to perform a data classification of the document. Second application 422 may then store the results of the data classification on enterprise database 434 so that the classification can be utilized by any other application that may be able to utilize the classification.

Figure 7:
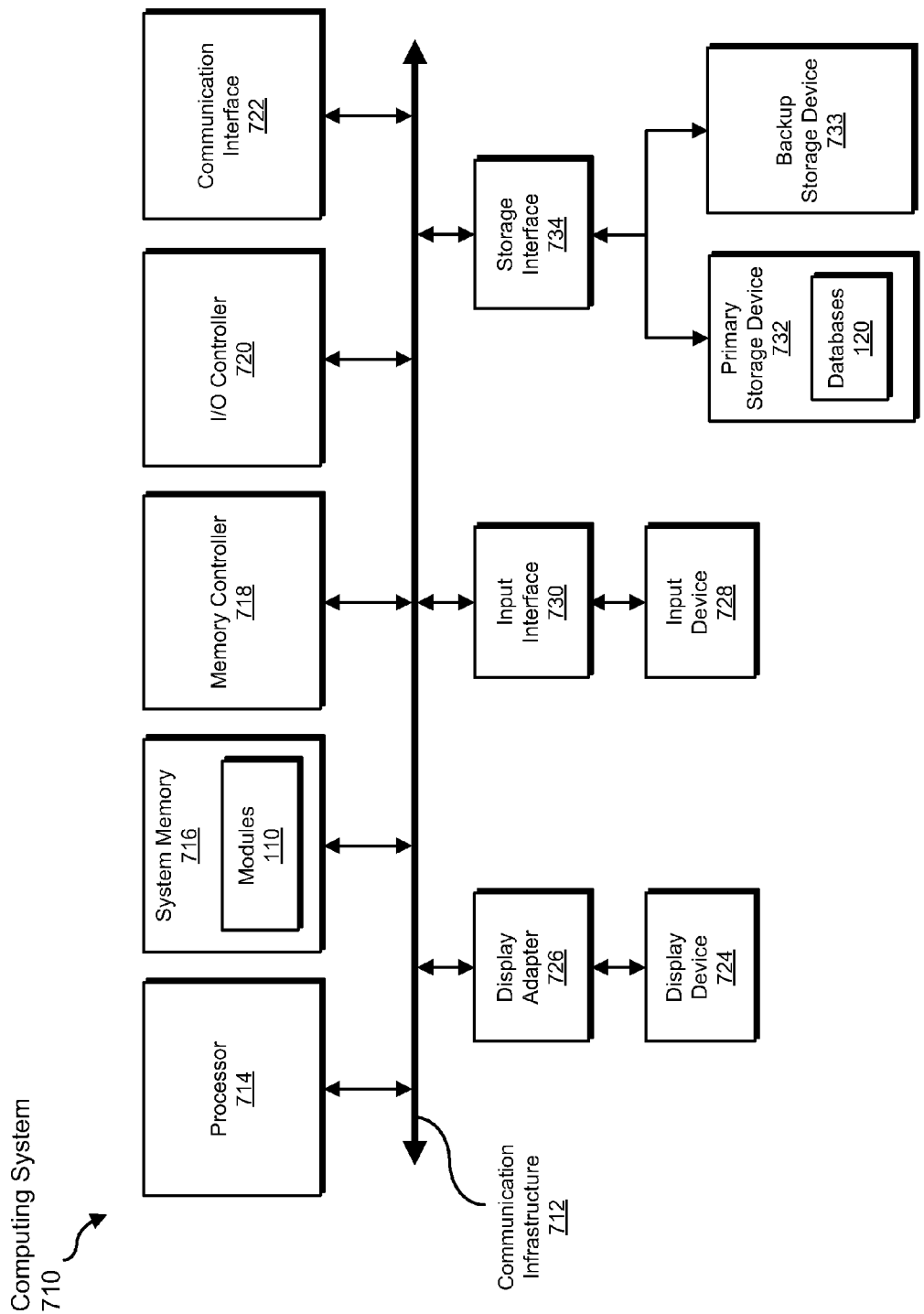
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the receiving, converting, tokenizing, creating, storing, sending, performing, generating, executing, associating, and/or indexing steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory ("RAM"), read only memory ("ROM"), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 110 from FIG. 1 may be loaded into system memory 716 illustrated in FIG. 7.

In certain embodiments, exemplary computing system 710 may also include one or more components or elements in addition to processor 714 and system memory 716. For example, as illustrated in FIG. 7, computing system 710 may include a memory controller 718, an Input/Output ("I/O") controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller 718 may perform and/or be a means for performing, either alone or in combination with other elements, one or more of the steps or features described and/or illustrated herein, such as receiving, converting, tokenizing, creating, storing, sending, performing, associating, and/or indexing.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing, either alone or in combination with other elements, one or more of the receiving, converting, tokenizing, creating, storing, sending, performing, generating, executing, associating, and/or indexing steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 794 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the receiving, converting, tokenizing, creating, storing, sending, performing, generating, executing, associating, classifying, and/or indexing steps disclosed herein. Communication interface 722 may also be used to perform and/or be a means for performing other steps and features set forth in the instant disclosure.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the receiving, converting, tokenizing, creating, storing, sending, performing, generating, executing, associating, classifying, and/or indexing steps disclosed herein. Input device 728 may also be used to perform and/or be a means for performing other steps and features set forth in the instant disclosure.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710. In one example, databases 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, storage devices 732 and 733 may be used, for example, to perform and/or be a means for performing, either alone or in combination with other elements, one or more of the receiving, converting, tokenizing, creating, storing, sending, performing, generating, executing, associating, classifying, and/or indexing steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit ("ASIC") adapted to implement one or more of the exemplary embodiments disclosed herein.

Figure 8:
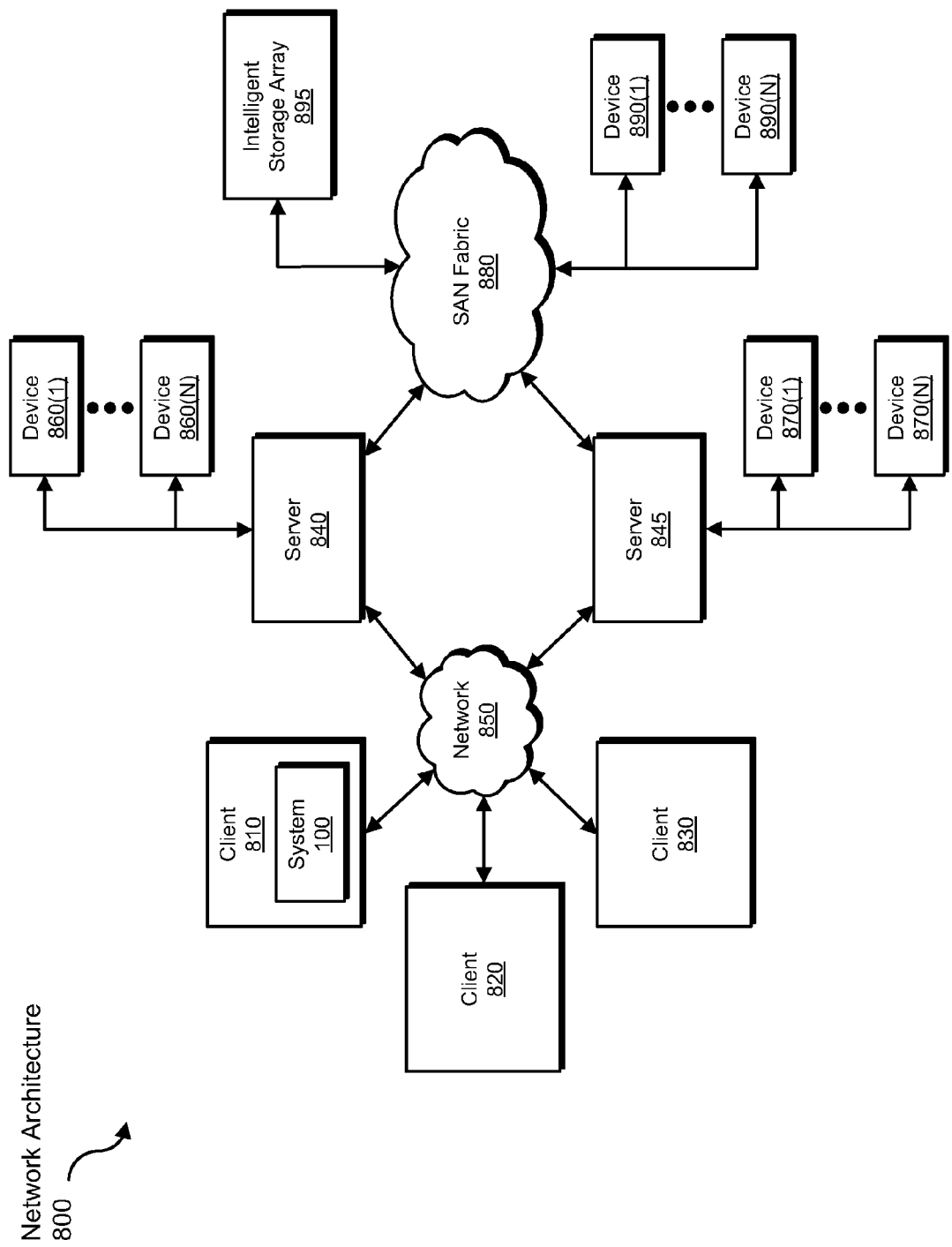
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. In one example, client systems 810, 820, and/or 830 and/or servers 840 and/or 845 may include all or a portion of system 100 from FIG. 1.

Similarly, servers 840 and 845 generally represent computing devices or systems, such as application servers or database servers, configured to provide various database services and/or run certain software applications. Network 850 generally represents any telecommunication or computer network including, for example, an intranet, a wide area network ("WAN"), a local area network ("LAN"), a personal area network ("PAN"), or the Internet.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage ("NAS") devices configured to communicate with servers 840 and 845 using various protocols, such as NFS, SMB, or CIFS.

Servers 840 and 845 may also be connected to a storage area network ("SAN") fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the receiving, converting, tokenizing, creating, storing, sending, performing, generating, executing, associating, classifying, and/or indexing steps disclosed herein. Network architecture 800 may also be used to perform and/or be a means for performing other steps and features set forth in the instant disclosure.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

One or more of the software modules described herein may transform data, physical devices, and/or representations of physical devices from one form to another. For example, one or more of the modules described herein may transform the state of a data storage device by storing indexing data to the data storage device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for indexing data for use by a plurality of applications, at least a portion of the method being performed by a computing device comprising at least one processor, the method comprising:
    receiving a program-specific data object at a first application of a plurality of applications, the program-specific data object being configured to be accessed by at least one program type;
    determining, based on metadata associated with the program-specific data object, that an index of tokens associated with the program-specific data object is not stored in a database that is accessible by the plurality of applications, wherein the plurality of applications comprise two or more application types;
    converting, after determining that the index of tokens associated with the program-specific data object is not stored in the database, the program-specific data object to a common-form data object;
    tokenizing the common-form data object to extract tokens from the common-form data object;
    creating an index of the tokens extracted from the common-form data object, the index of the tokens extracted from the common-form data object being formatted to be utilized by each of the plurality of applications;
    performing a first data classification of the program-specific data object to obtain a first set of classification data that is associated with the program-specific data object and particular to the first application;
    storing the common-form data object, the index of the tokens extracted from the common-form data object, and the first set of classification data in the database that is accessible by the plurality of applications;
    receiving, from a second application of the plurality of applications that has received the program-specific data object, a request for the index of the tokens extracted from the common-form data object;
    allowing the second application to access the index of the tokens extracted from the common-form data object;
    receiving, from the second application, a second set of classification data that is associated with the program-specific data object and particular to the second application, the first set of classification data being different than the second set of classification data;
    storing the second set of classification data in the database that is accessible by the plurality of applications.

2. The method of claim 1, wherein the common-form data object comprises at least one of:
    markup language;
    plain text.

3. The method of claim 1, further comprising:
    receiving, from another application of the plurality of applications, a request for the common-form data object;
    sending the common-form data object to the other application.

4. The method of claim 1, further comprising generating at least one of:
    metadata associated with the program-specific data object;
    a hidden file associated with the program-specific data object.

5. The method of claim 1, further comprising
    associating at least one of the first set of classification data and the second set of classification data with at least one of:
    the common-form data object;
    the index of the tokens extracted from the common-form data object.

6. The method of claim 5, wherein associating the first set of classification data and the second set of classification data with the common-form data object comprises adding data tags referencing the results of the first data classification and results of a second data classification.

7. The method of claim 1, wherein performing the first data classification comprises classifying data in the program-specific data object based on at least one of:
    indexed metadata;
    indexed content;
    extracted patterns;
    extracted entities.

8. The method of claim 1, further comprising executing at least one policy based on at least one of the first set of classification data and the second set of classification data, the policy comprising at least one of:
    a spam policy;
    an anti-virus policy;
    a data-loss-prevention policy;
    an intellectual property leak-prevention policy;
    an archiving policy;
    a backup policy;
    a content-management policy;
    a legal-compliance policy;
    an electronic-discovery policy.

9. The method of claim 1, wherein the first application performs at least one of:
    converting the program-specific data object to the common-form data object;
    tokenizing the common-form data object;
    creating the index of the tokens extracted from the common-form data object;
    performing the first data classification of the program-specific data object;
    performing language detection on the common-form data object.

10. The method of claim 1, wherein the first application instructs a third application to perform at least one of:
    converting the program-specific data object to the common-form data object;
    tokenizing the common-form data object;
    creating the index of the tokens extracted from the common-form data object;
    performing the first data classification of the program-specific data object;
    performing language detection on the common-form data object.

11. The method of claim 1, further comprising performing at least one of:
    language detection on the common-form data object;
    pattern detection on the common-form data object;
    entity extraction on the common-form data object.

12. The method of claim 1, wherein the plurality of application types comprises two or more of:
    a search engine;

an archiving application;
a data-loss-prevention application;
a spam-filtering application;
an anti-virus application;
a backup application;
a content-management application;
a legal-compliance application;
an electronic-discovery application.

13. The method of claim 1, tangibly embodied as computer-executable instructions on at least one non-transitory computer-readable storage medium.

14. The method of claim 1, wherein the program-specific data object comprises at least one of a:
   DOC file;
   PDF file;
   XLS file;
   PPT file;
   MSG file.

15. A computer-implemented method for indexing data for use by a plurality of applications, at least a portion of the method being performed by a computing device comprising at least one processor, the method comprising:
   receiving a program-specific data object at a first application of a plurality of applications, the program-specific data object being configured to be accessed by at least one program type;
   determining, based on metadata associated with the program-specific data object, that an index of tokens associated with the program-specific data object is not stored in a database that is accessible by the plurality of applications, wherein the plurality of applications comprise two or more application types;
   converting, after determining that the index of tokens associated with the program-specific data object is not stored in the database, the program-specific data object to a common-form data object;
   tokenizing the common-form data object to extract tokens from the common-form data object;
   creating an object index of the tokens extracted from the common-form data object, the object index being formatted to be utilized by each of the plurality of applications;
   performing a first data classification of the program-specific data object to obtain a first set of classification data that is associated with the program-specific data object and particular to the first application;
   storing the common-form data object and the first set of classification data in the database that is accessible by the plurality of applications;
   storing the object index of the tokens extracted from the common-form data object in a master index that includes indexing information associated with a plurality of program-specific data objects, the master index being accessible by the plurality of applications;
   receiving, from a second application of the plurality of applications that has received the program-specific data object, a request for the object index;
   allowing the second application to access the object index;
   receiving, from the second application, a second set of classification data that is associated with the program-specific data object and particular to the second application, the first set of classification data being different than the second set of classification data;
   storing the second set of classification data in the database that is accessible by the plurality of applications.

16. The method of claim 15, wherein the master index comprises a plurality of object indexes received from two or more of the plurality of applications.

17. The method of claim 15, tangibly embodied as computer-executable instructions on at least one non-transitory computer-readable storage medium.

18. A system for indexing data for use by a plurality of applications, the system comprising:
   a database that is accessible by a plurality of applications, the plurality of applications comprising two or more application types;
   a communication module programmed to:
      receive a program-specific data object at a first application of the plurality of applications, the program-specific data object being configured to be accessed by at least one program type;
      determine, based on metadata associated with the program-specific data object, that an index of tokens associated with the program-specific data object is not stored in the database that is accessible by the plurality of applications;
   a conversion module programmed to convert, after determining that the index of tokens associated with the program-specific data object is not stored in the database, the program-specific data object to a common-form data object;
   a tokenization module programmed to tokenize the common-form data object to extract tokens from the common-form data object;
   a classification module programmed to perform a first data classification of the program-specific data object to obtain a first set of classification data that is associated with the program-specific data object and particular to the first application;
   an indexing module programmed to:
      create an index of the tokens extracted from the common-form data object, the index of the tokens extracted from the common-form data object being formatted to be utilized by each of the plurality of applications;
      store the common-form data object, the index of the tokens extracted from the common-form data object, and the first set of classification data in the database that is accessible by the plurality of applications;
   a data-sharing module programmed to:
      receive, from a second application of the plurality of applications that has received the program-specific data object, a request for the index of the tokens extracted from the common-form data object;
      allow the second application to access the index of the tokens extracted from the common-form data object;
      receive, from the second application, a second set of classification data that is associated with the program-specific data object and particular to the second application, the first set of classification data being different than the second set of classification data;
      store the second set of classification data in the database that is accessible by the plurality of applications.

19. The system of claim 18, wherein the program-specific data object is configured to be accessed by the program type, the system further comprising:
   a language-detection module programmed to perform language detection on the common-form data object;
   a security module programmed to limit data access to authorized applications.

* * * * *